United States Patent
Eiting et al.

(10) Patent No.: US 7,918,124 B2
(45) Date of Patent: Apr. 5, 2011

(54) NON-CONTACT SHAPE SENSOR AND DEVICE FOR MOVING SHEET MATERIAL

(75) Inventors: John Eiting, Minster, OH (US); Guil Bergman, St. Henry, OH (US)

(73) Assignee: Machine Concepts, Inc., Minster, OH (US)

( * ) Notice: Subject to any disclaimer, the term of this patent is extended or adjusted under 35 U.S.C. 154(b) by 280 days.

(21) Appl. No.: 11/935,148

(22) Filed: Nov. 5, 2007

(65) Prior Publication Data
US 2009/0113993 A1  May 7, 2009

(51) Int. Cl.
*G01B 13/04* (2006.01)
(52) U.S. Cl. ........................................................ 73/37.7
(58) Field of Classification Search ................... 73/37.7
See application file for complete search history.

(56) References Cited

U.S. PATENT DOCUMENTS

| | | | |
|---|---|---|---|
| 3,496,744 A * | 2/1970 | Mizuno et al. | 72/11.7 |
| 3,641,810 A | 2/1972 | Smirmaul | |
| 4,031,741 A * | 6/1977 | Schaming | 73/37.7 |
| 4,292,838 A * | 10/1981 | Larsen | 73/37.7 |
| 4,422,988 A | 12/1983 | Kornylak | |
| 4,771,622 A | 9/1988 | Ginzburg | |
| 4,809,527 A * | 3/1989 | Mitchell | 72/11.4 |
| 6,442,369 B1 | 8/2002 | Swartz et al. | |
| 6,769,279 B1 | 8/2004 | Bergman et al. | |
| 2006/0123888 A1* | 6/2006 | Galburt et al. | 73/37.5 |

FOREIGN PATENT DOCUMENTS

JP                52043452 A  *  4/1977

* cited by examiner

*Primary Examiner* — Hezron Williams
*Assistant Examiner* — Nathaniel Kolb
(74) *Attorney, Agent, or Firm* — Standley Law Group LLP (57) ABSTRACT

A non-contact shape sensor and shape sensing device employing a plurality of such sensors. A non-contact shape sensor of the present invention may include a fluid-emitting sensor head that is biased toward a surface of a moving strip of material by a linear actuator. Pressurized fluid emitted from said fluid-emitting sensor head forms a cushion that causes said strip of material to remain separated from and glide over said fluid-emitting sensor head without actual contact therewith. A linear displacement sensor is associated with each non-contact shape sensor to measure the linear displacement of its fluid-emitting sensor head by said linear actuator in response to a loose section of said strip of material passing by said fluid-emitting sensor head.

13 Claims, 7 Drawing Sheets

FIG. 1 (KNOWN DEVICE)

FIG. 2
(KNOWN DEVICE)

FIG. 7b

NON-CONTACT SHAPE SENSOR AND DEVICE FOR MOVING SHEET MATERIAL

BACKGROUND OF THE INVENTIVE FIELD

The present invention is directed to a shape sensor and shape sensing device for detecting the shape of a moving strip of material. More particularly, the present invention is directed to a shape sensor and shape sensing device that can be used to detect a non-flat condition of a moving strip of material without the need to make contact therewith.

Strip (which may also be referred to herein as "sheet") materials are used or produced in various industries. In at least certain of these industries, it is desired that a strip of material of interest have as flat a profile as possible. Unfortunately, it is also known that at least certain strip material manufacturing processes commonly impart one or more types of deformation to the strip materials produced thereby, which deformation tends to reduce the flatness of the strip materials. To that end, various devices, systems and techniques have been developed for both detecting and correcting the flatness of a moving strip of material.

While not limited thereto, a common use of such aforementioned flatness detecting and correcting devices, systems and techniques occurs in the production of strip metal products, wherein hot slabs or billets of steel and other metals are rolled into thin sheets. This hot-rolling process, as well as several devices, systems and techniques for detecting and/or correcting the flatness of sheet metal products produced thereby, is described in more detail in U.S. Pat. No. 6,857,301 (the '301 patent) to Bergman et al., which is hereby incorporated by reference herein.

As described in the '301 patent, hot-rolling mills typically produce sheet metals by using a series of rolls to exert a pressing force on a hot slab or billet that is passed beneath the rolls. However, exertion of a uniform pressing (flattening) force across the width of the strip is difficult. Consequently, finished strip materials often possess undesirable shape defects, such as a wavy edge(s) or a center buckle. These shape defects are generally the result of a non-uniform lengthwise stretching of the strip across its width. This non-uniform stretching produces stresses within the strip that lead to shape defects such as those recited above.

As also described in the '301 patent, microprocessor-controlled multi-roll levelers capable of automatically correcting for such shape defects in metal strip materials now exist. Shape defects in the strip materials may be detected and provided to these levelers by shape measurement devices. Both the air-bearing shape meter and displacement-type shape sensor described in the '301 patent are capable of detecting shape defects in moving strips of metal and other materials. Basically, an air-bearing shape meter operates to detect shape defects by sensing changes in the contact forces imparted thereto by a passing strip of material. A displacement-type shape sensor operates to detect shape defects by measuring an amount of linear displacement of a sensor(s) thereof afforded by a loose section of a strip of material passing overhead.

While both of the air-bearing shape meter and displacement-type shape sensor described in the '301 patent work quite well for most materials, it is nonetheless realized that there exist certain materials wherein the properties and/or final use thereof make it preferable to detect shape defects therein by a device/system that does not directly contact the material. A non-contact shape sensor and device of the present invention provides this ability.

SUMMARY OF THE GENERAL INVENTIVE CONCEPT

The present invention is directed to a non-contact shape sensor and shape sensing device that is able to detect shape defects in a moving strip of material without the need to make contact therewith. Rather, a non-contact shape sensor of the present invention employs a fluid-emitting sensor head that allows a moving strip of material passing by the sensor head to float on a cushion of fluid (e.g., air).

The fluid-emitting sensor head is mounted in a bracket that preferably, but not essentially, allows for pivoting of the sensor head. The sensor head and bracket are associated with a linear actuator, such as a pneumatic or hydraulic cylinder, that is used to move the sensor head to an operating location that is in close proximity to one side of a moving strip of material. Pressurized fluid emitted from a plurality of nozzles on the surface of the sensor head produces the cushion of fluid that separates the sensor head from the moving strip of material during operation. A position transducer or some other linear displacement detector is associated with the non-contact shape sensor, such as with the linear actuator or the sensor head mounting bracket.

A non-contact shape sensor of the present invention operates by detecting loose areas across the width of the moving strip of material. When such a loose area passes by the fluid-emitting sensor head, the force exerted by the linear actuator causes a linear displacement of the sensor head toward the strip of material (while still maintaining the cushion of fluid therebetween). This linear displacement of the sensor head is detected and measured by the displacement detector and is used to detect and measure shape defects in the moving strip of material. A non-contact shape sensing device of the present invention may comprise a number of such fluid-emitting sensor head equipped shape sensors arranged to traverse the width of a moving strip of material. A non-contact shape sensing device of the present invention may be used to detect shape defects in moving strips of various materials, which may be located in diverse settings. A non-contact shape sensing device of the present invention may be used in conjunction with, or separately from, a leveler.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
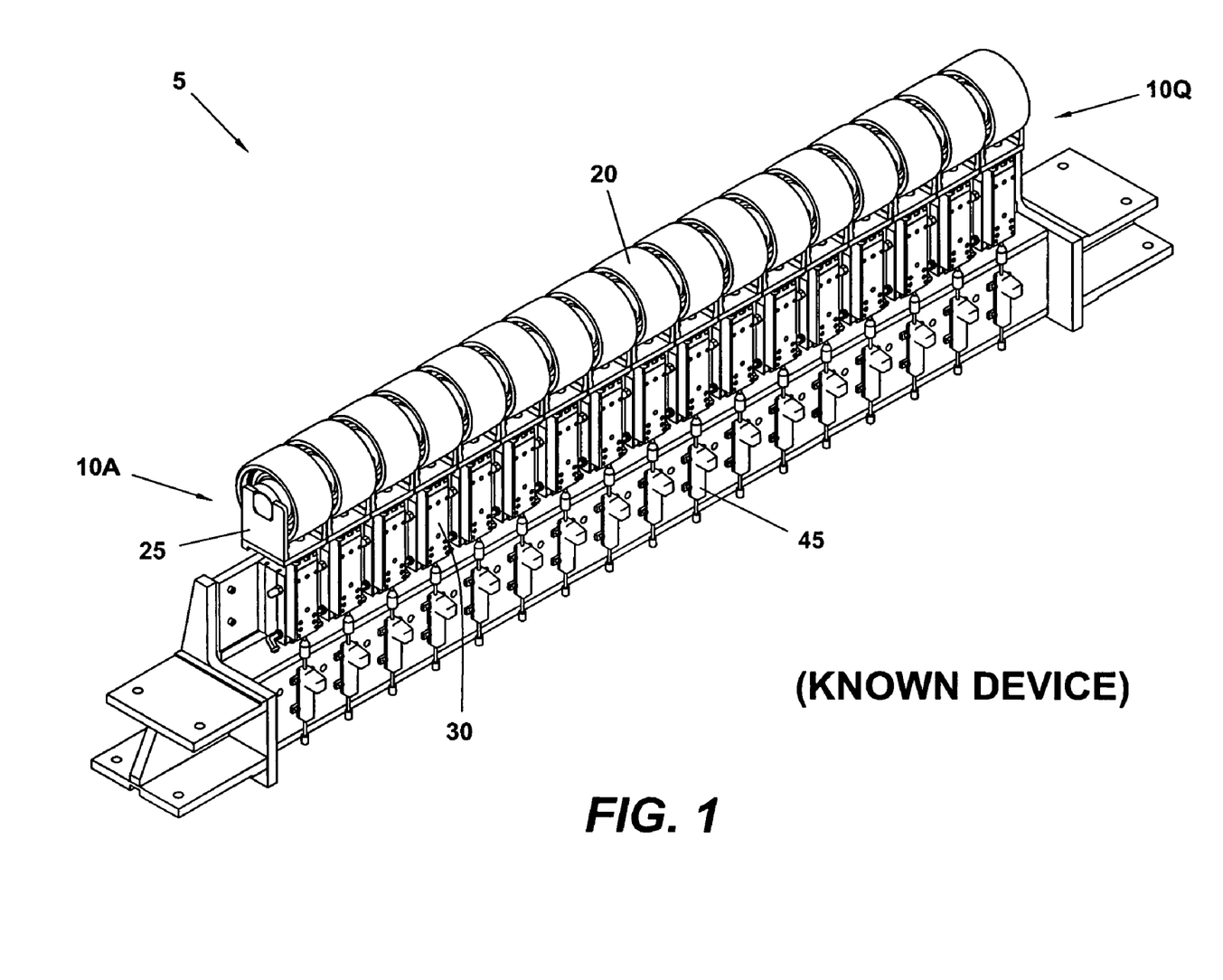
FIG. 1 illustrates a known displacement-type shape sensor device for detecting shape defects in a moving sheet of material.
Figure 2:
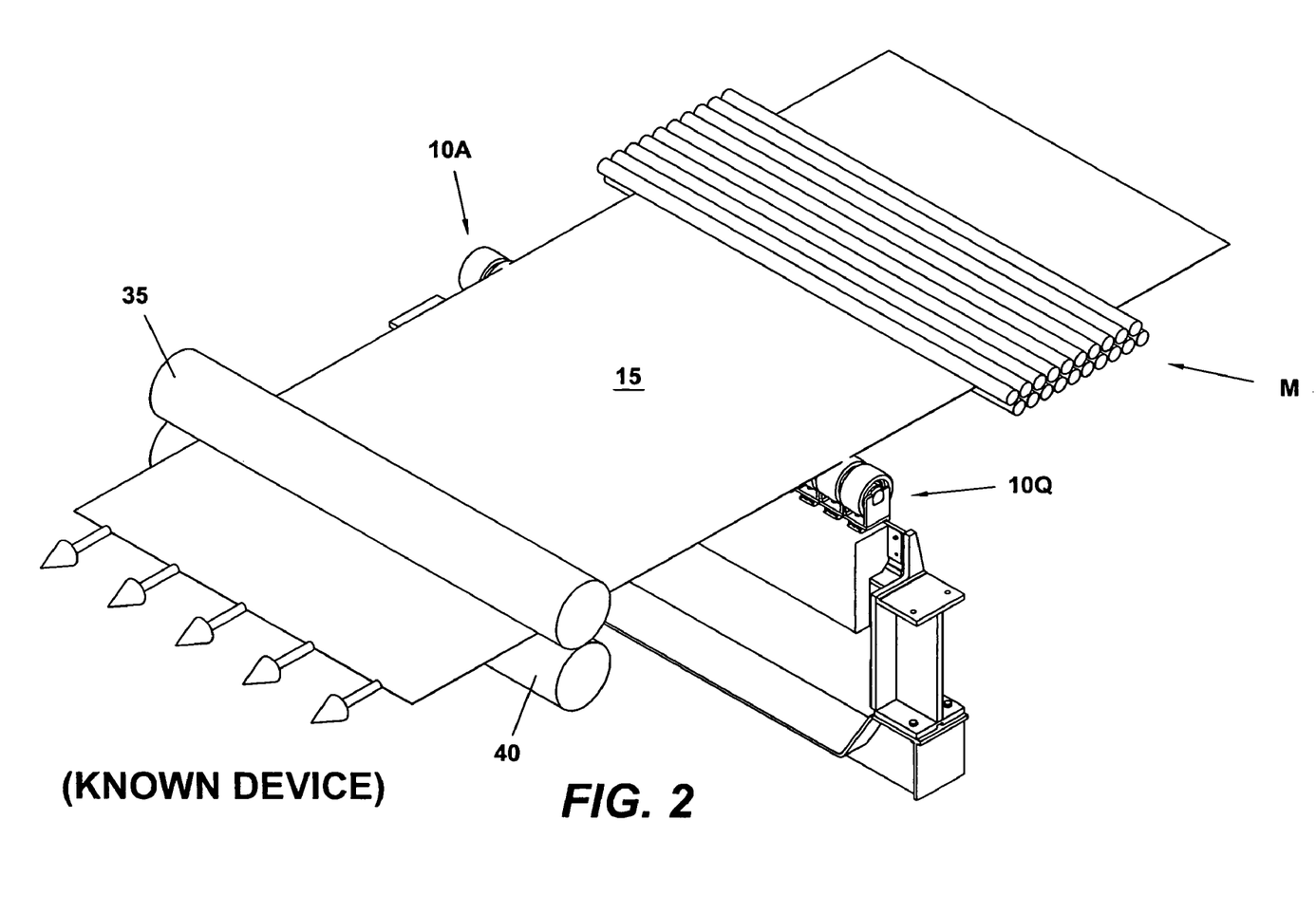
FIG. 2 schematically illustrates the device of FIG. 1 being used to detect shape defects in a moving sheet of material as it exits a roll-leveling device.

A known displacement type shape sensing device 5 is shown in FIGS. 1-2. This particular type of shape sensing device is disclosed in the '301 patent referenced above, and operates to detect shape defects in a moving strip of material by measuring the displacement of a plurality of individual displacement sensors 10A-10Q. Such a displacement-type shape sensor may be situated at the exit of a multi-roll leveler (illustrated schematically as M) that is used to flatten metal strip material.

The displacement sensors 10A-10Q are aligned, and arranged to traverse the width of a strip of material 15 moving in a direction as indicated by the arrows (see FIG. 2). The individual displacement sensors 10A-10Q are each comprised of a free spinning precision roller bearing 20 attached by a mounting bracket 25 to a linear actuator 30 which, in this case, is a pneumatic cylinder. This particular pneumatic cylinder 30 is provided with an integral linear guide mechanism (not shown). The pneumatic cylinder 30 imparts linear movement to the displacement sensors 10A-10Q.

The displacement type shape sensing device 5 detects loose areas across the width of the moving strip of material 15. Particularly, the displacement sensors 10A-10Q are designed to be forced against the top or bottom surface of the strip of material 15 as the strip passes by. The displacement sensors 10A-10Q may be mounted to a rigid cross-member (not shown) or other suitable mounting structure, so as to ensure that any measured displacement of the displacement sensors is due to a shape defect in the strip 15, and not sensor mounting deflection.

In operation, the strip 15 is placed under tension, such as by its placement between a series of straight rolls 35, 40 of a leveler. The individual displacement sensors 10A-10Q are then driven by the pneumatic cylinders 30 against the bottom (in this case) of the strip 15 as it passes overhead. A linear measurement device 45 is associated with each displacement sensor 10A-10Q to measure the displacement thereof as it is pressed against the strip 15. Deflections of the strip of material are caused by the pressure exerted thereagainst by the displacement sensors 10A-10Q.

Figure 3:
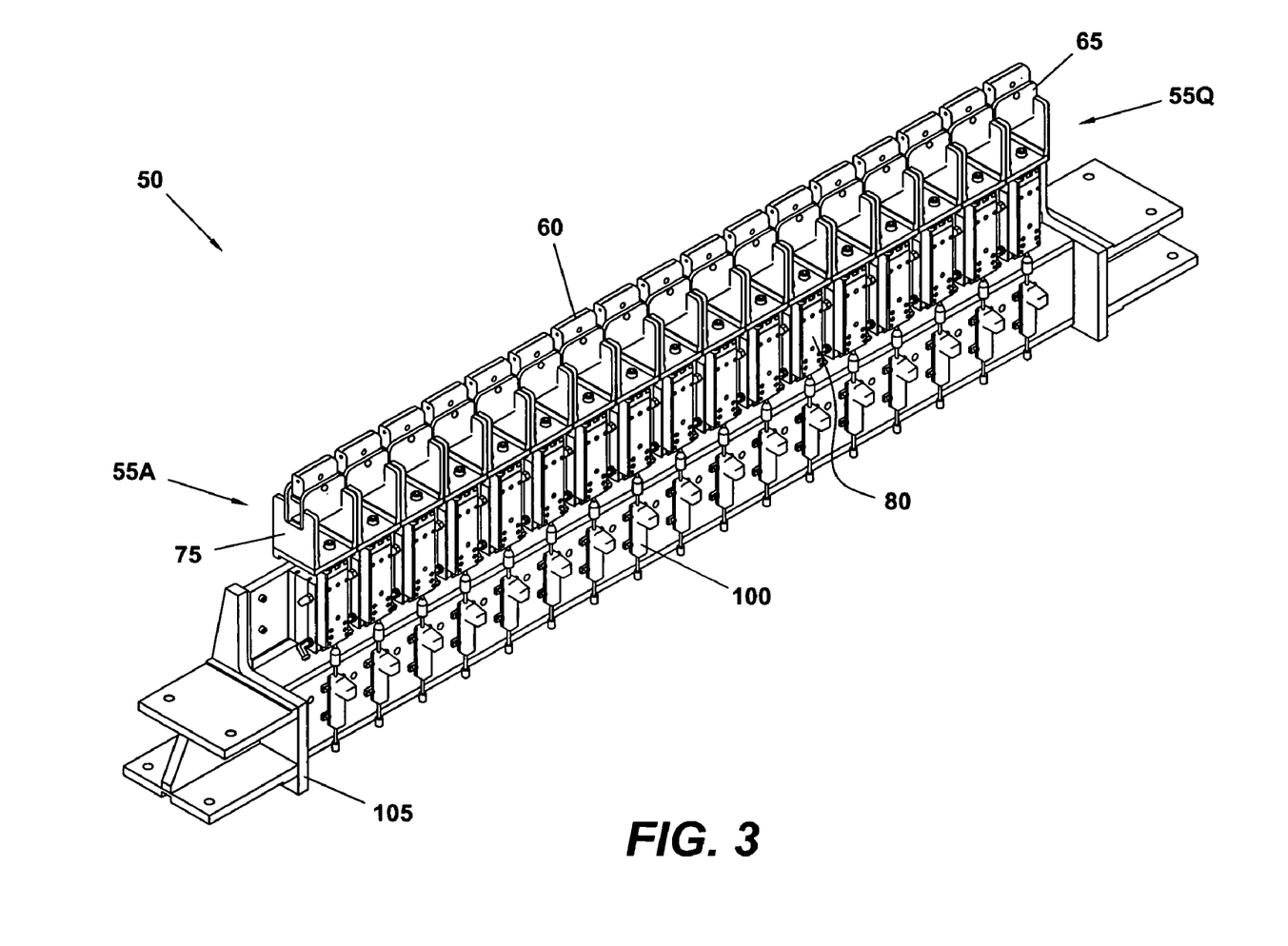
FIG. 3 depicts one embodiment of a non-contact shape sensing device of the present invention.

A non-contact shape sensing device of the present invention operates in a similar manner, but detects shape defects in a moving strip of material without the need to make contact therewith. More specifically, a non-contact shape sensing device of the present invention detects defects in a moving continuous strip of material (e.g., metal) that often appear as an edge wave or center buckle. Such defects are typically due to the strip being of different lengths across its width. For example, a strip that exhibits a wavy edge likely has a length along that edge that exceeds the length of the strip near its center. Thus, the wavy edge of the strip constitutes a loose zone. In the case of a strip of moving material that exhibits a center buckle, the length of the strip in the area of the buckle is likely greater than the length of the strip at its edge(s). Thus, the center buckle of the strip constitutes a loose zone. A non-contact shape sensing device of the present invention detects these loose zones across the width of the strip. An exemplary embodiment of a non-contact shape sensing device 50 of the present invention is depicted in FIG. 3.

In a manner similar to that of the displacement type shape sensing device 5 of FIG. 1, the non-contact shape sensing device 50 can be seen to include a plurality of individual non-contact shape sensors 55A-55Q. As shown most clearly in FIGS. 4a-4b, each non-contact shape sensor 55A-55Q includes a fluid-emitting sensor head 60 retained in a sensor head mounting bracket 65. Preferably, the sensor head mounting bracket 65 allows the fluid-emitting sensor head 60 to pivot in a direction that is substantially perpendicular to the length of the moving strip of material that the displacement type shape sensing device 5 will be used to examine. For this purpose, this particular embodiment of the fluid-emitting sensor head 60 is connected to the sensor head mounting bracket 65 by a pivot pin P that passes through a pivot hole 70 in the sensor head. Other pivoting arrangements may also be employed.

Figure 4A:
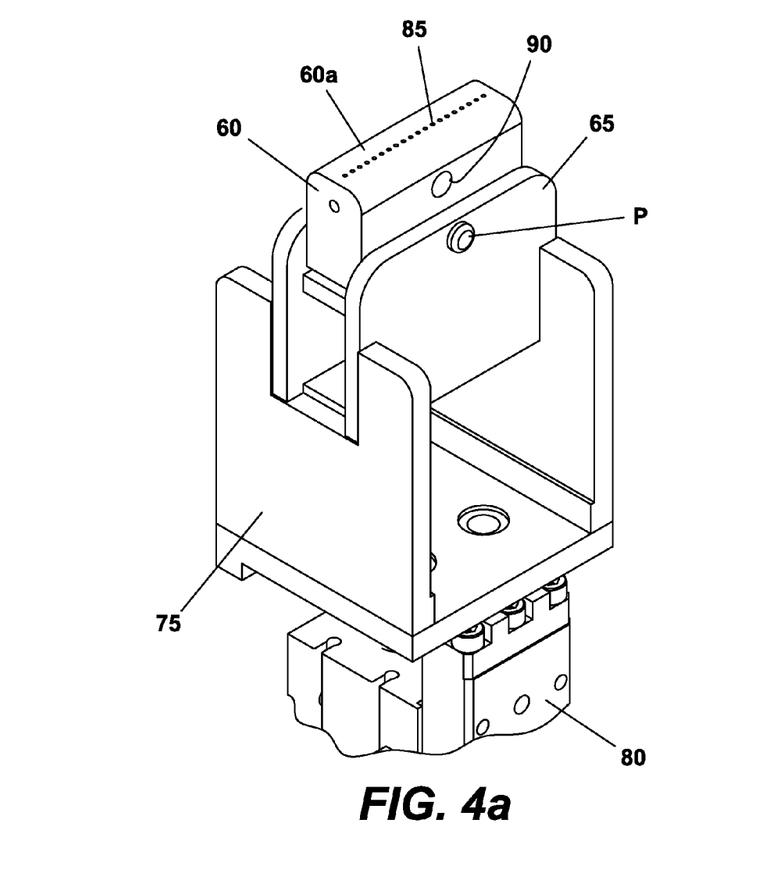
FIG. 4a is an enlarged view of a portion of an exemplary modular non-contact shape sensor of the non-contact shape sensing device of FIG. 3.

The particular embodiment of the non-contact shape sensor 55 shown in FIG. 4a is partially modular in design. That is, the fluid-emitting sensor head 60 is designed to fit in a universal mounting bracket 75 that is in turn attached to a linear actuator 80. The universal mounting bracket 75 may also receive and retain a roller bearing of the displacement type shape sensing device 5 of FIG. 1. When an fluid-emitting sensor head 60 is employed, the sensor head mounting bracket 65 is adapted to sit in retention slots of the universal mounting bracket 75 that are otherwise occupied by the ends of the roller bearing shaft when the contact type sensor of the device of FIG. 1 is used. This modular design allows a single shape sensing device to use both a contact type and non-contact type shape sensor, and to easily switch therebetween.

Figure 4B:
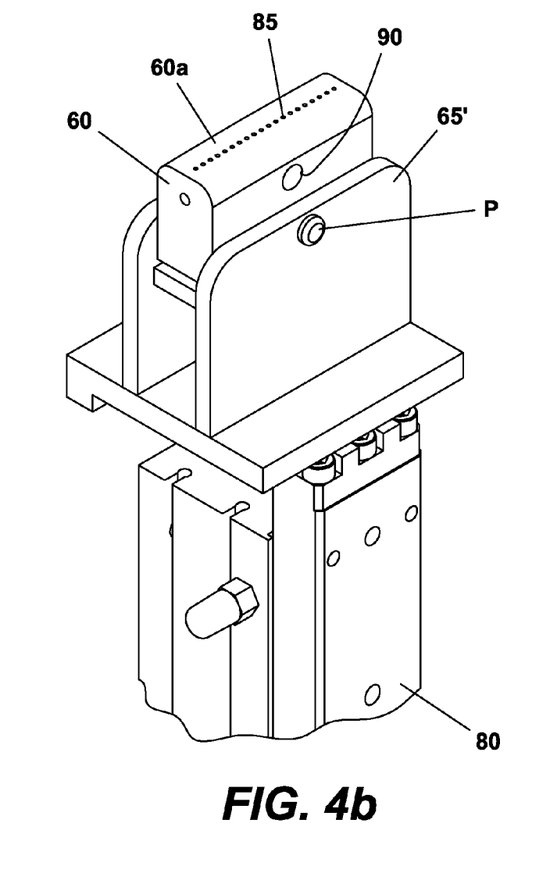
FIG. 4b is an enlarged view of a portion of an exemplary non-modular non-contact shape sensor that can be alternatively used with the present invention.

As would be understood by one skilled in the art, however, a non-modular non-contact shape sensor design is also possible. As shown in FIG. 4b, a sensor head mounting bracket 65' may be adapted for direct attachment to a linear actuator—eliminating the need for the universal mounting bracket 75.

The fluid-emitting sensor head 60 is associated with a linear actuator, whether directly by a non-modular bracket or, as shown, by the combination of the sensor head mounting bracket 65 and the universal mounting bracket 75. The linear actuator 80 may be electrically, pneumatically or hydraulically powered. In this particular embodiment, the linear actuator 80 is a pneumatic cylinder. This particular pneumatic cylinder 80 is provided with an integral linear guide mechanism (not shown). Such pneumatic cylinders would be known to those of skill in the art and, therefore, need not be described in detail herein. In other embodiments, a pneumatic cylinder may be coupled to an external (non-integral) linear guide mechanism. It may also be possible to forego the use of a linear guide mechanism, although it is believed that the use of such may improve shape defect detection and measurement accuracy.

In a similar manner to the displacement type shape sensing device of FIG. 1, the pneumatic cylinder 80 provides for linear displacement of the fluid-emitting sensor head 60 toward the moving strip of material. As is described in more detail below, however, the fluid-emitting sensor head 60 is not placed in contact with the strip of material. A linear displacement sensor 100 is provided to measure the amount of linear displacement of the fluid-emitting sensor head 60.

Figure 5A:
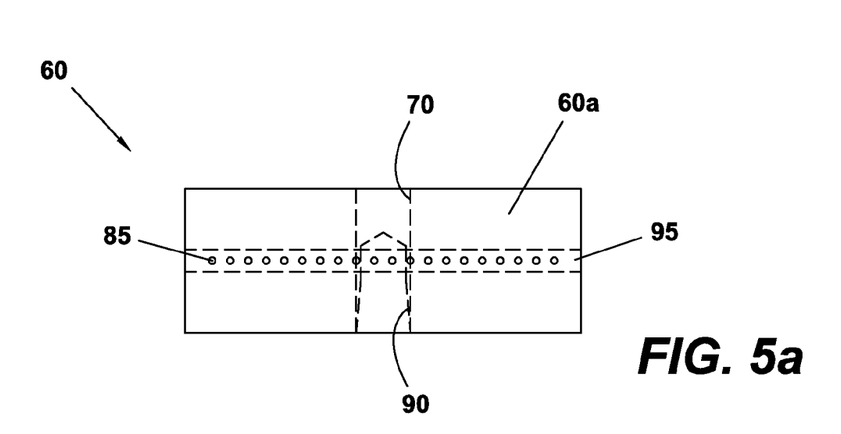
FIGS. 5a-5c are a top plan view, front elevation view and right-side elevation view, respectively, of an fluid-emitting sensor head portion of the module of FIG. 4.
Figure 5B:
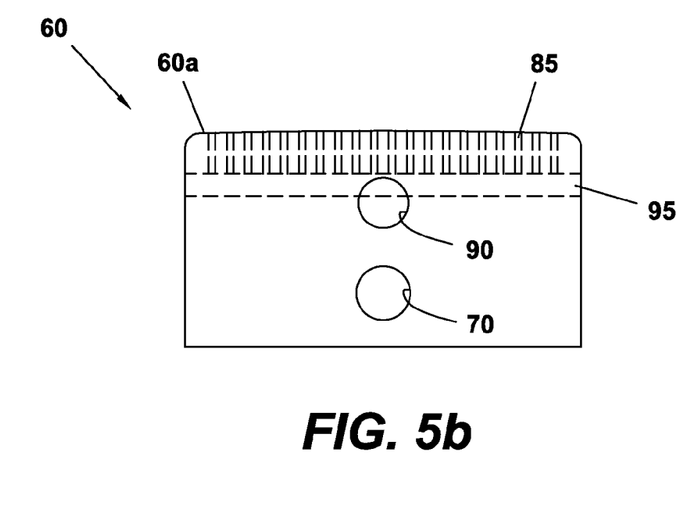
Figure 5C:
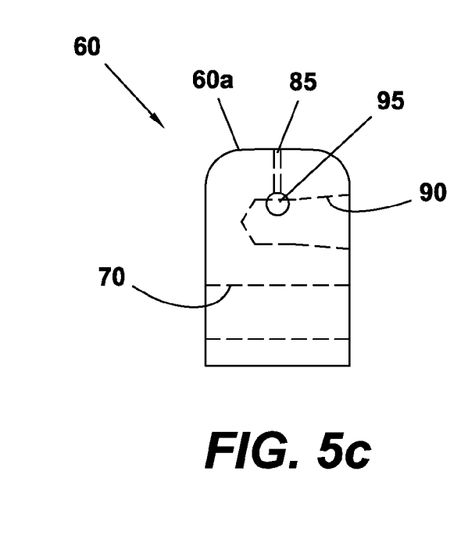

As can be best observed in FIGS. 4-5c, the fluid-emitting sensor head 60 is designed to receive and emit a supply of pressurized fluid during operation. To that end, the top surface 60a of the fluid-emitting sensor head 60 is provided with a plurality of nozzle holes 85 that are located and oriented to direct the pressurized fluid at the passing surface of a moving strip of material. Various fluids may be used in conjunction with the present invention including, without limitation, air and other gases, water, cleaning liquids such as water/soap mixtures, and liquid coolants.

In one particular embodiment of a fluid-emitting sensor head designed to emit pressurized air, the use of a single row of 20 nozzle holes each of approximately 0.05 inches in diameter was found to work well. However, whether emitting air or another fluid, other fluid-emitting sensor head embodiments may employ a different number of nozzle holes, which may be distributed in a different pattern and may also be of different size and/or shape. The number, design and location of the nozzle holes may depend on a number of factors such as, without limitation, the type of fluid to be emitted by the fluid-emitting sensor head 60, the pressure of the fluid being emitted, and the properties of the moving strip of material being examined. Although not shown herein, it is also contemplated that nozzles of various size and design may be inserted into the nozzle holes in order to more precisely shape and/or direct the flow of emitted fluid in a particular manner.

An fluid-emitting sensor head of the present invention may be constructed from various materials, including various metals and plastics. The fluid-emitting sensor head 60 shown herein is constructed of an ultra high molecular weight plastic, which is unlikely to mark or otherwise mar the surface of the material being examined if there is inadvertent contact therebetween. Furthermore, such materials are lightweight, durable and easily machined.

The particular fluid-emitting sensor head 60 shown herein is machined from a solid block of such material. The nozzle holes 85 may then be drilled directly therein, as may one or more fluid supply receiving holes 90 and a nozzle hole connecting passageway 95. The fluid supply receiving hole 90 is provided to receive a fluid supply line or another conduit carrying fluid from a pressurized source to the fluid-emitting sensor head 60. The fluid supply receiving hole 90 may have a fitting associated therewith for this purpose. The nozzle hole connecting passageway 95 serves to connect the various nozzle holes 85 to the supply of fluid entering the fluid-emitting sensor head 60 through the fluid supply receiving hole 90. The ends of the nozzle hole connecting passageway 95 may be plugged or otherwise sealed after machining to prevent the leakage of fluid therefrom.

The surface profile of a fluid-emitting sensor head 60 of the present invention may vary. It has been discovered, however, that contouring a fluid-emitting sensor head of the present invention helps ensure that the strip of material to be examined floats on a cushion of fluid instead of making unwanted contact with the fluid-emitting sensor head. As such, this particular embodiment of the fluid-emitting sensor head 60 is provided with a radius along each of the edges on its fluid-emitting (top) surface. Other contours are also possible. It is also possible that a fewer number of edges may be contoured and that dissimilar contours may appear on the same fluid-emitting sensor head.

Figure 6:
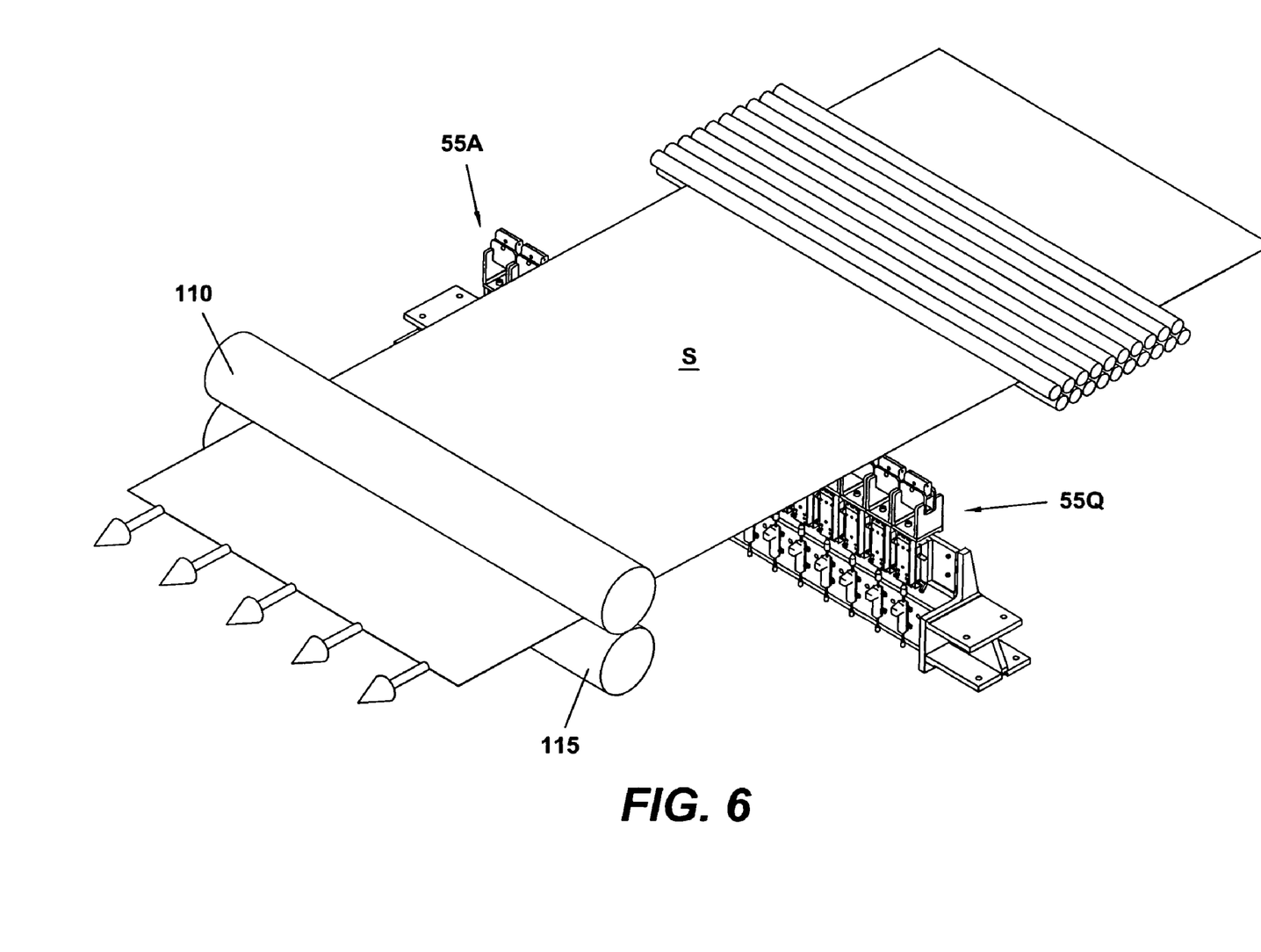
FIG. 6 schematically illustrates the device of FIG. 3 being used to detect shape defects in a moving sheet of material as it exits a roll-leveling device.

The non-contact shape sensing device 50 can be seen to have a number of non-contact shape sensors 55A-55Q aligned and arranged to traverse the width of a strip of material S moving in a direction as indicated by the arrows (see FIG. 6). The individual non-contact shape sensors 55A-55Q are each preferably mounted to a rigid cross-member 105 or other suitable mounting structure, so that it can be ensured that any measured displacement of the fluid-emitting sensor heads 60 is due to a shape defect in the strip of material, and not sensor mounting deflection.

Preferably, the pressure of the fluid supplied to each fluid-emitting sensor head 60 of the non-contact shape sensing device 50 is approximately the same. This helps to ensure that the fluid emitted by each fluid-emitting sensor head 60 exerts substantially the same amount of force on the strip of material S. As such, each non-contact shape sensors 55A-55Q should react in substantially the same manner to a similar shape defect. This may be accomplished in various ways, any number of which would be obvious to one skilled in the art.

To conserve fluid, it is also preferable, but not essential to the present invention, that only those non-contact shape sensors 55A-55Q that are being used are supplied with pressurized fluid. For example, when the width of a non-contact shape sensing device of the present invention exceeds the width of a strip of material to be examined, it is possible that certain ones of the non-contact shape sensors 55A-55Q may be deactivated. Such deactivation may occur manually, or automatically by a control system associated with the non-contact shape sensing device or another device with which the non-contact shape sensing device operates in conjunction. In a similar manner, it is possible to supply pressurized fluid to the nozzle holes of the fluid-emitting sensor heads only when the non-contact shape sensing device is in operation (e.g., when the fluid-emitting sensor heads and linear actuators are in an extended position).

Referring now to FIG. 6, the strip of material to be examined S is placed under tension, such as by its placement between a series of straight rolls 110, 115 of a leveler (when present) or another tensioning device that would be familiar to one skilled in the art. The fluid-emitting sensor heads 60 of the individual non-contact shape sensors 55A-55Q are then moved by the pneumatic cylinders 80 to a position in close proximity to the bottom surface (in this case) of the strip of material S as it passes overhead. The fluid emitted by the fluid-emitting sensor heads 60 prevents the strip of material S from contacting the fluid-emitting sensor heads 60. Rather, the strip of material S glides over the fluid-emitting sensor heads 60 on a cushion of fluid trapped therebetween.

The linear displacement sensors 100 measure the displacement of their respective fluid-emitting sensor heads 60 as the sensor heads are moved by the pneumatic cylinders 80 in reaction to a shape defect in the strip of material S. That is, the linear displacement sensors 100 measure the displacement of their respective fluid-emitting sensor heads 60 as a loose section of the moving strip of material passes thereover.

Figure 7A:
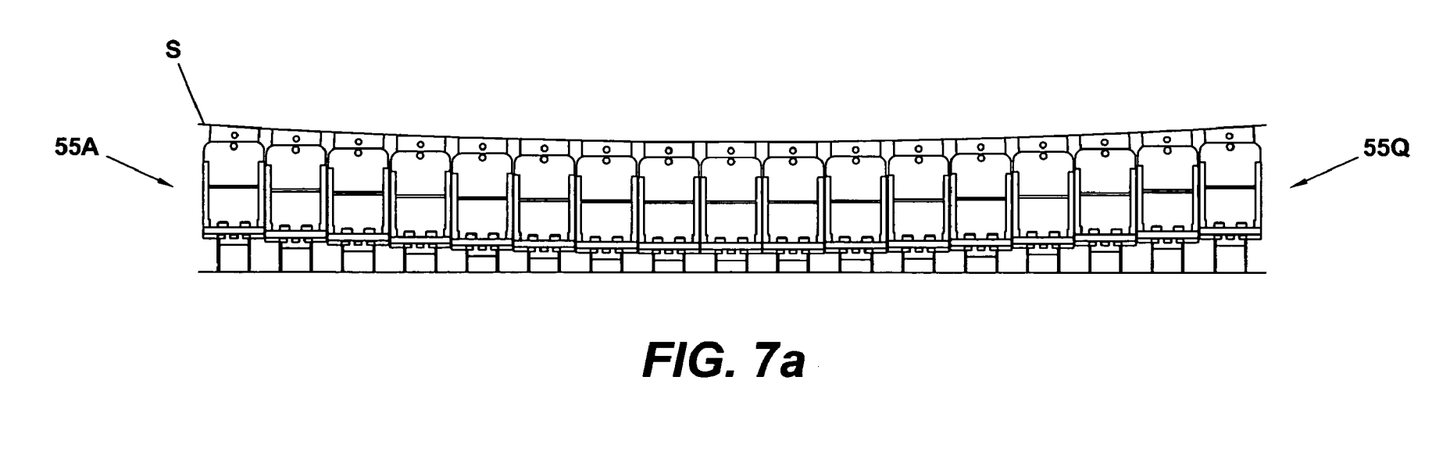
FIGS. 7a-7b show how the non-contact shape sensing device of FIG. 3 can react to changes in the shape of a strip of material being examined.
Figure 7B:
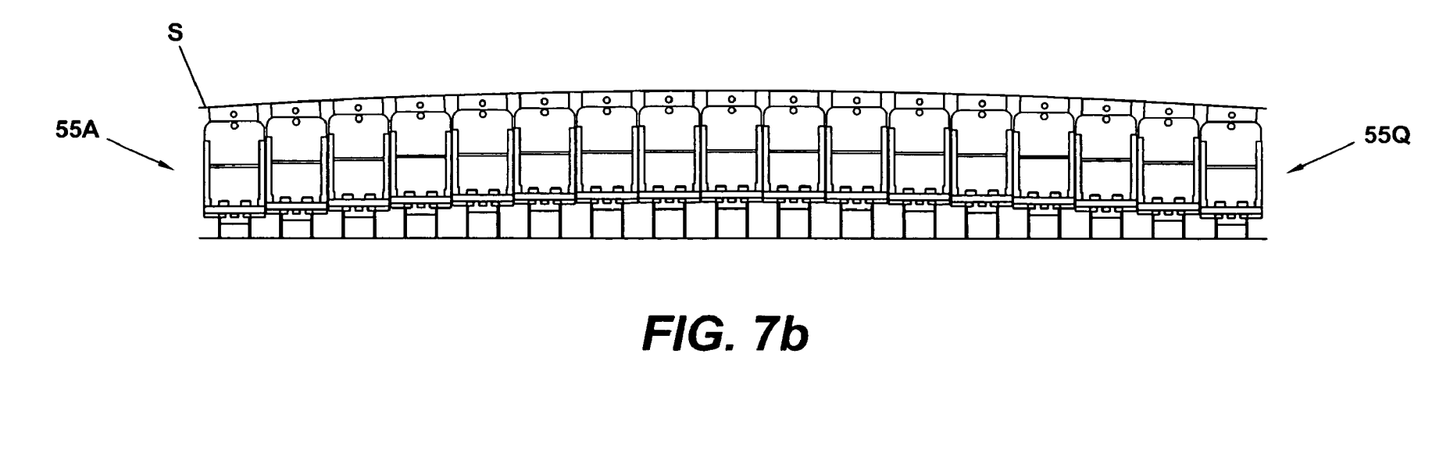

As illustrated in FIGS. 7a-7b, the linearly displaceable and pivotal design of a non-contact shape sensor 55 of the present invention allows an associated fluid-emitting sensor head 60 to adapt to various strip material angles and also, to shape defects. Note, however, that fluid emitted from the fluid-emitting sensor heads 60 nonetheless maintains a gap between the emitting surface of the sensor heads and the associated surface of the moving strip of material.

A non-contact shape sensing device of the present invention may be associated with an automatic roll leveler, such as that described in the '301 patent, or another device operating on the strip of material of interest. Readings from the non-contact shape sensors 55A-55Q can be received, reviewed and, optionally, stored. When used in conjunction with certain devices, readings from the non-contact shape sensors 55A-55Q can be used to adjust a leveling process or some other process that remedies detected shape defects in the strip of material.

While certain embodiments of the present invention are described in detail above, the scope of the invention is not to be considered limited by such disclosure, and modifications are possible without departing from the spirit of the invention as evidenced by the following claims:

What is claimed is:

1. A non-contact shape sensing device comprising:
   a plurality of non-contact shape sensors aligned and arranged to traverse the width of a moving strip of material, each of said non-contact shape sensors further comprising:
      a substantially rectangular fluid-emitting sensor head arranged such that a long dimension thereof is oriented substantially perpendicular to a direction of travel of said strip of material, said head adapted for communication with a source of pressurized fluid and to emit a flow of pressurized fluid through a plurality of nozzle holes located therein,
      a linear actuator for biasing said fluid-emitting sensor head toward a surface of said moving strip of material, and
      a linear displacement sensor for measuring an amount of displacement of said fluid-emitting sensor head in response to the passage thereby of a shape defect in said moving strip of material,
   a rigid support structure for the mounting of said non-contact shape sensors; and
   a supply of pressurized fluid in communication with said fluid-emitting sensor heads of said non-contact shape sensors, said pressurized fluid emitted by said fluid-emitting sensor heads during operation of said device to produce a cushion of fluid that separates said fluid-emitting sensor heads from said moving strip of material;
   wherein said fluid-emitting sensor heads of said non-contact shape sensors are arranged and minimally spaced such that fluid-emitting surfaces thereof collectively underlie or overlie substantially the entire width of a moving strip of material.

2. The non-contact shape sensing device of claim 1, wherein said fluid-emitting sensor heads are pivotally connected to said linear actuators such that said fluid-emitting sensor heads can pivot in at least a direction substantially perpendicular to the direction of travel of said moving strip of material.

3. The non-contact shape sensing device of claim 1, further comprising a universal mounting bracket attached to said linear actuator, said universal mounting bracket adapted to receive and retain a fluid-emitting sensor head mounting bracket.

4. The non-contact shape sensing device of claim 3, wherein said universal mounting bracket is adapted to also receive and retain other sensor heads, regardless of whether said sensor heads are of a non-contact or contact design.

5. The non-contact shape sensing device of claim 1, wherein said fluid emitted by said fluid-emitting sensor heads is selected from the group consisting of air and other gases, water, cleaning liquids, and liquid coolants.

6. The non-contact shape sensing device of claim 1, wherein said device is associated with and in communication with a multi-roll leveler.

7. The non-contact shape sensing device of claim 1, wherein non-contact shape sensors lying outside the width of said moving strip of material may be deactivated.

8. A modular non-contact shape sensing device for detecting shape defects in a moving strip of material, comprising:
   a plurality of non-contact shape sensors aligned and arranged to traverse the width of said strip of material, each of said non-contact shape sensors further comprising:
      a substantially rectangular fluid-emitting sensor head arranged such that a long dimension thereof is oriented substantially perpendicular to a direction of travel of said strip of material, said fluid-emitting sensor head adapted to receive a flow of pressurized fluid and provided with a plurality of nozzle holes linearly arranged along said long dimension to direct said pressurized fluid at a surface of said moving strip of material,
      a linear actuator for biasing said fluid-emitting sensor head toward said surface of a moving strip of material,
      a fluid-emitting sensor head mounting bracket for pivotally coupling said fluid-emitting sensor head to said linear actuator,
      a universal mounting bracket attached to said linear actuator and adapted to receive and retain said fluid-emitting sensor head mounting bracket as well as other sensor heads, regardless of whether said other sensor heads are of a non-contact or contact design, and
      a linear displacement sensor for measuring an amount of displacement of said fluid-emitting sensor head in response to the passage thereby of a loose section in said moving strip of material,
   a rigid support structure for the mounting of said non-contact shape sensors; and
   a supply of pressurized fluid in communication with said fluid-emitting sensor heads of said non-contact shape sensors, said pressurized fluid emitted by said fluid-emitting sensor heads during operation of said device to produce a cushion of fluid that separates said fluid-emitting sensor heads from said moving strip of material;
   wherein said fluid-emitting sensor heads of said non-contact shape sensors are arranged and minimally spaced such that said nozzle holes thereof collectively direct pressurized fluid against substantially the entire width of a moving strip of material.

9. The modular non-contact shape sensing device of claim 8, wherein said fluid emitted by said fluid-emitting sensor heads is selected from the group consisting of air and other gases, water, cleaning liquids, and liquid coolants.

10. The modular non-contact shape sensing device of claim 8, wherein said device is associated with and in communication with a multi-roll leveler.

11. The modular non-contact shape sensing device of claim 10, wherein non-contact shape sensors lying outside the width of said moving strip of material may be deactivated.

12. A non-contact method of detecting shape defects in a moving strip of material, comprising:
   providing a plurality of non-contact shape sensors, each of said non-contact shape sensors further comprising:
      a substantially rectangular fluid-emitting sensor head arranged such that a long dimension thereof is oriented substantially perpendicular to a direction of travel of said strip of material, said fluid-emitting sensor head adapted to receive a flow of pressurized fluid and provided with a plurality of nozzle holes linearly arranged along said long dimension to direct said pressurized fluid at a surface of said moving strip of material,
      a linear actuator for biasing said fluid-emitting sensor head toward said surface of a moving strip of material,
      a mounting bracket for pivotally connecting said fluid-emitting sensor head to said linear actuator, and
      a linear displacement sensor for measuring an amount of displacement of said fluid-emitting sensor head in response to the passage thereby of a loose section in said moving strip of material, mounting said non-contact shape sensors to a rigid support structure located either below or above said moving strip of material;

placing said fluid-emitting sensor heads in communication with a supply of pressurized fluid;

locating said fluid-emitting sensor heads of said non-contact shape sensors to traverse the width of said strip of material, said fluid-emitting sensor heads arranged such that nozzle holes thereof collectively direct pressurized fluid against substantially the entire width of a moving strip of material; and using readings from said linear displacement sensors to detect and measure shape defects in said moving strip of material.

13. The method of claim 12, wherein said fluid emitted by said fluid-emitting sensor heads is selected from the group consisting of air and other gases, water, cleaning liquids, and liquid coolants.

* * * * *